United States Patent [19]

Howells et al.

[11] 4,227,184
[45] Oct. 7, 1980

[54] MODIFIED MILLER CODE ENCODER

[75] Inventors: George A. Howells, Bishop's Stortford; Douglas E. Woodman, Harlow, both of England

[73] Assignee: International Standard Electric Corporation, New York, N.Y.

[21] Appl. No.: 970,895

[22] Filed: Dec. 19, 1978

[51] Int. Cl.² .................................................. H04L 3/00
[52] U.S. Cl. ................................ 340/347 DD; 360/43
[58] Field of Search .................. 340/347 DD; 178/66; 364/40, 41, 42, 43, 44

[56] References Cited

U.S. PATENT DOCUMENTS

| | | | |
|---|---|---|---|
| 3,560,947 | 2/1971 | Franchini | 360/43 |
| 3,623,041 | 11/1971 | MacDougal | 340/347 DD |
| 3,810,111 | 5/1974 | Patel | 340/347 DD |
| 3,995,264 | 11/1976 | Ouchi | 340/347 DD |

OTHER PUBLICATIONS

Taub, "IBM Technical Disclosure Bulletin", vol. 21, No. 1, Jun. 1978, pp. 361-362.

Primary Examiner—Charles D. Miller
Attorney, Agent, or Firm—John T. O'Halloran; Alfred C. Hill

[57] ABSTRACT

A method of balancing digital signals encoded in the Miller Code, which is inherently an unbalanced code. Additional coding rules are utilized based on the use of a transition interval extending from the begining of a bit period to the begining of the next but one bit to define an adjacent pair of Binary 1's for certain specific data sequences.

5 Claims, 10 Drawing Figures

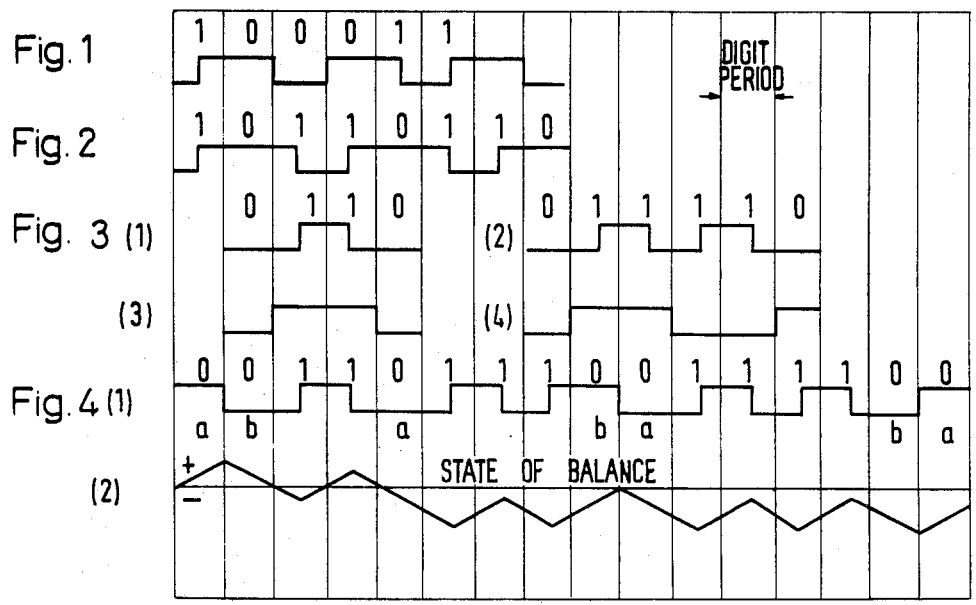
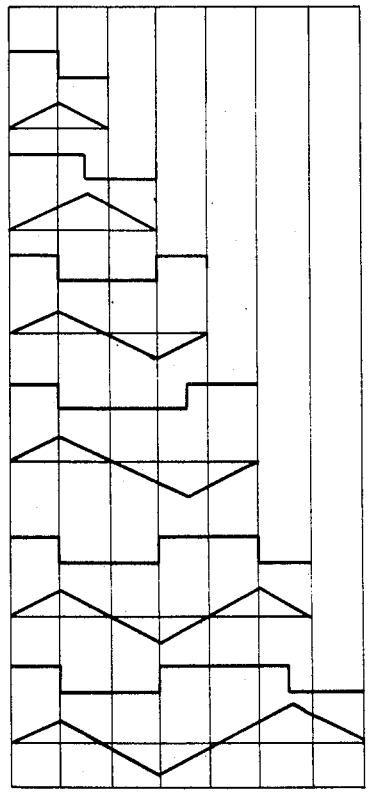

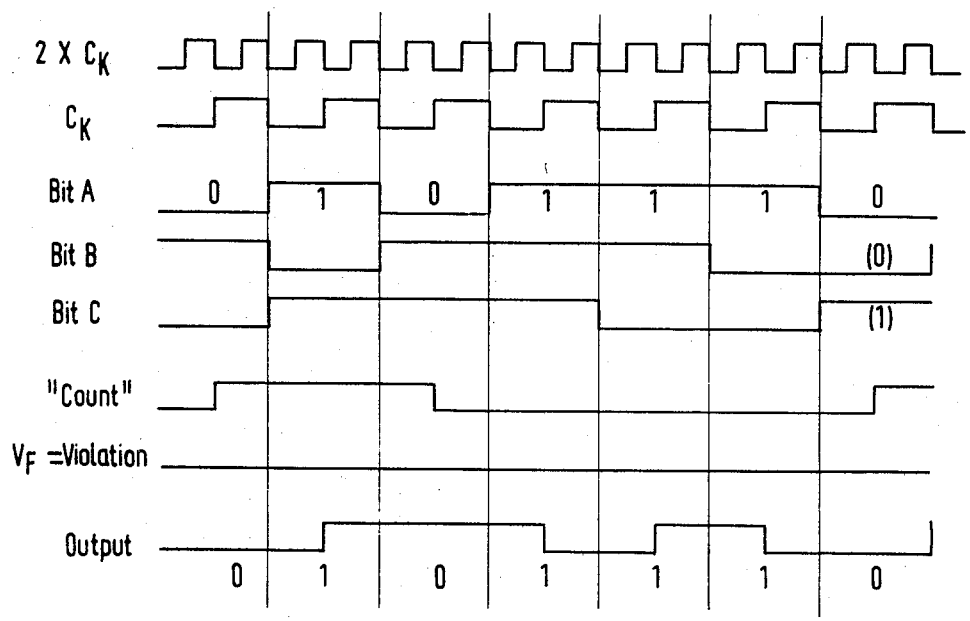
Fig. 7
Fig. 8
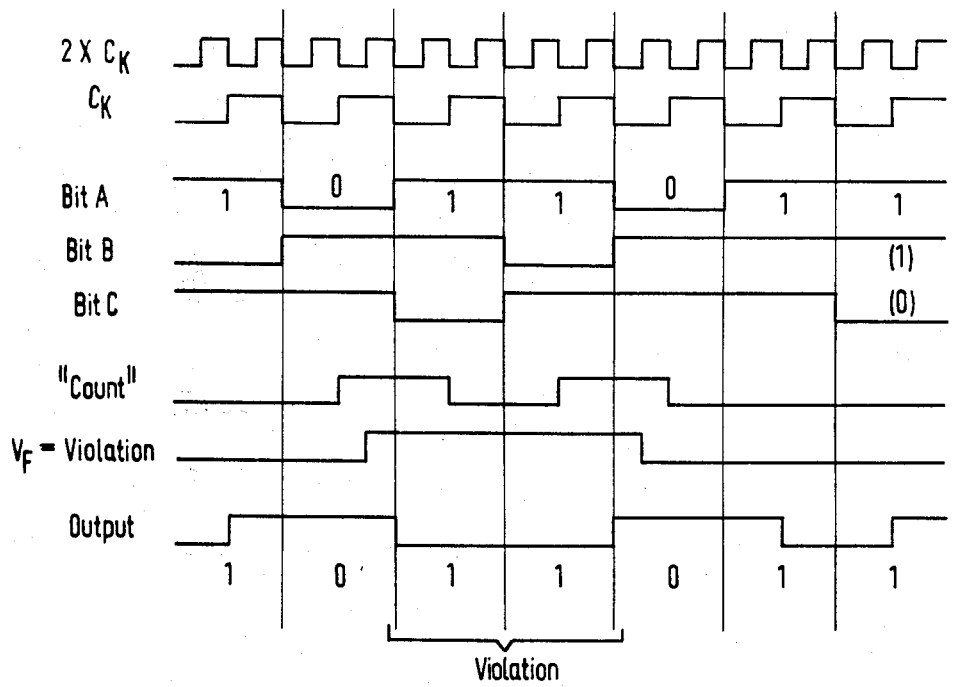

MODIFIED MILLER CODE ENCODER

BACKGROUND OF THE INVENTION

This invention relates to apparatus for the transmission of binary digital data which has been encoded in a code of the type known as the Miller Code.

The Miller Code represents the two binary states by a transition in the center of a bit period for one of the states and no transition there for the other. If two consecutive bit periods each have no transition in the center, then instead there is a transition between the two periods. Hereinafter a transition in the center of a bit period is assumed to represent a binary one and no transition a binary zero. An example of a code sequence is given in FIG. 1.

The code is inherently imbalanced and the random data frequency spectrum contains significant low frequency components which extend down to zero. The worst case imbalance occurs when transmitting a 1011011 pattern, and this is illustrated in FIG. 2. This imbalance is a significant disadvantage of the Miller Code in many applications, in particular when transformers need to be used.

SUMMARY OF THE INVENTION

According to the present invention there is provided apparatus for encoding binary digital data in a modified Miller Code wherein from a given time of transmission transmitted binary zeros are paired in successive exclusive pairs and each succeeding pair of binary ones occurring after the first zero of a pair of zeros are encoded by a transition separation of two digit periods or multiples thereof extending from the transition corresponding to the first zero of the pair.

BRIEF DESCRIPTION OF THE DRAWING

An embodiment of the invention will now be described with reference to FIGS. 3-9 of the accompanying drawings, in which:

FIG. 3 illustrates the basic modification to the Miller Code according to the invention, FIG. 4 illustrates an example of a coding sequence of a conventional Miller Code, FIG. 5 illustrates a succession of coding sequences in the modified Miller Code according to the invention, FIGS. 7-9 illustrate timing diagrams for various sequences encoded by the encoder of FIG. 6.

DESCRIPTION OF THE PREFERRED EMBODIMENT

Figure 6:
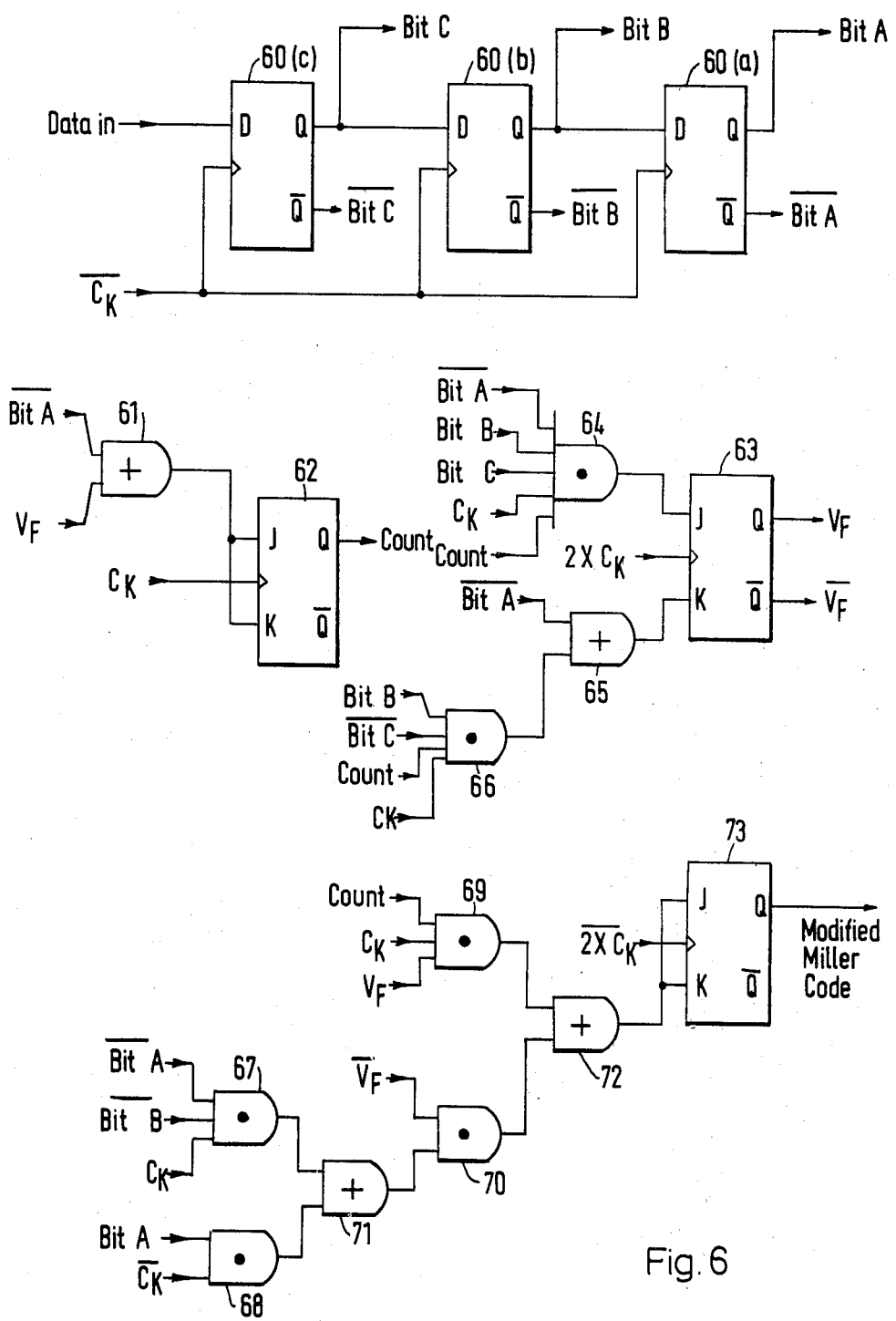
FIG. 6 illustrates the basic elements of an encoder for the modified Miller Code.

Examination of the application of the Miller Code, as illustrated in FIGS. 1 and 2, indicates that adjacent transitions can be separated by 2 bit periods. This only occurs for a 101 sequence and it can be seen that the transition separation extends from the center of one bit period to the center of the next but one bit period. It follows that in the Miller Code there are no transition separation intervals extending from the beginning of one bit period to the beginning of the next but one bit period.

The invention uses this transition separation interval as an additional coding means with the objective of achieving balanced operation. The appropriate modification is to use the additional separation interval to designate adjacent pairs of binary 1's in some specific binary sequences.

Imbalance in the conventional Miller Code occurs when two binary 0's are separated by an even number of 1's. Two typical sequences are illustrated in FIG. 3(1) and 3(2). In FIG. 3(1) the pair of 0's are separated by two 1's and in FIG. 3(2) by four 1's (i.e. two successive pairs of 1's). Such sequences can be balanced by the use of the modified Miller Code, as shown in FIGS. 3(3) and 3(4) respectively. In each case the pair of 1's is now defined by a transition period of two complete digit periods, the transition occurring at the ends of the digit periods.

Consider now the more general coding sequence of FIG. 4(1) assuming that a balanced condition exists at the beginning of the first bit of the sequence.

FIG. 4(2) indicates the balanced condition for the sequence. The 0's in the sequence are paired (a,b) for convenience.

It is evident that imbalance extending over a period greater than two bit periods occurs when the first 0 of a pair of 0's paired off from the start of the sequence is followed by a sequence of 1's. If the sequence contains an odd number of 1's, then balance is ultimately achieved at the end of the second 0 of a pair. This degree of imbalance is substantially equivalent to that occurring in the Alternate Mark Inversion Code.

If, however, the sequence contains an even number of 1's, then a balanced condition is not achieved at the end of the second 0 of a pair, and an increasing imbalance can result as indicated.

The modified encoding rules to obtain balanced operation are described below.

From a given time interval of transmission, the 0's transmitted are paired off exclusively. If after the first 0 of a pair there is a sequence of 1's, then each pair of adjacent 1's are encoded by a transition separation of two bit periods extending from the transition corresponding to the first 0. This process continues until the second 0 of a pair occurs, or the presence of a single 1 before the second 0. The resulting encoding is illustrated in FIG. 5 for various sequences of 1's. It is evident that the 010 sequence is a limiting case and is coded normally. It is important to note that no special account is taken of sequences of 1's occurring between the pairs of 0's.

Examination of the examples of FIG. 5 indicates that the maximum interval between instances when the waveform is balanced is 3 bit periods. The latter occurs in examples (2), (4) and (6). The corresponding maximum imbalance at any time is that equivalent to a transition interval of 1½ bit periods, as shown in examples (2), (4) and (6).

The basic elements required for encoding in the modified Miller Code are shown in FIG. 6. The encoder requires, as indicated above, a look ahead facility which is provided by entering the data to be encoded into a three stage shift register, exemplified by the D-type bistable circuits 60(a), 60(b) and 60(c). Two clock pulse trains $C_K$ and $2 \times C_K$ are generated externally, and should run at the digit rate and twice the digit rate respectively. The $C_K$ clock pulses must have an even mark/space ratio and the transitions must coincide with the negative-going transitions of the $2 \times C_K$ clock pulse train. These clock pulse trains are illustrated in each of FIGS. 7-9. The incoming data is read into the bistables 60 under the control of inverted clock $C_K$. Thus bistable 60(a) holds the digit currently being transmitted, bistable 60(b) holds the next digit to be transmitted and bistable 60(c) holds the next-but-one digit to be transmitted. The digit outputs of the bistables are designated 'bit A', 'bit B' and 'bit C' respectively, and each bistable also provides respective output $\overline{\text{bit A}}$, $\overline{\text{bit B}}$ and $\overline{\text{bit C}}$ which is the inverse of its digit output. All the bistables are activated by a positive going transition on the relevant clock pulse input. The resultant state is determined only by the state of the D-input (or in the case of JK bistables by the state of the J and K inputs) immediately prior to their activation by the relevant clock.

The $\overline{\text{bit A}}$ output of bistable 60(a) is fed via OR gate 61 to a JK bistable 62, together with a $V_F$ output (from a further JK bistable 63) which functions as a "violation flag" indicating that the basic Miller Code needs to be modified as explained above. $V_F$ indicates that the coding of pairs of 1's is to follow the normal Miller rules when reset and the modified rules when set. $V_F$ is set by the J input to bistable 63 being high on a clock pulse. When $V_F$ is low the K input is irrelevant.

$V_F$ gets set ¾ of the way through the first 0 of a pair of 0s separated by at least two 1's. This is illustrated in period 2 of FIG. 8 and period 1 of FIG. 9. The output of gate 64 will go high when $\overline{\text{bit A}}$, bit B, bit C, $C_K$ and "count" are all high: $\overline{\text{bit A}}$ high indicates that the current bit is a 0, bit B and bit C both high indicates that the next two bits are 1's; $C_K$ stops the bistable from going high only ¼ of the way through the period; and "count" is high during the second half of a 0 only if it is the first 0 of a pair.

$V_F$ is reset by the K input to bistable 63 being high on a clock pulse. When $V_F$ is high the J input to the bistable is irrelevant. The two inputs to the OR gate 65 can each reset the bistable. If the number of 1's separating the pair of 0s of the violation is even then $\overline{\text{bit A}}$ will reset bistable 63 ¼ of the way through the bit period, if the number of 1's is odd then AND gate 66 will reset the bistable 63 ¾ of the way through the bit period before the final 1.

The output of bistable 73 is the modified Miller Code and it will have a transition at either the end of a bit period or half way through the bit period if the output of OR gate 72 is high, that is if either of its inputs is high.

The output of AND gate 69 will cause a transition in the output code at the end of a pair of 1's in a violation or at the end of the first 0 starting a violation. The output of OR gate 71 will generate transitions when the violation flag is not set. It can be set either at the end of a 0 followed by another 0 causing a transition in the code output at the end of the first 0 this being done by AND gate 67; or AND gate 68 causes at transition in the code output in the middle of a 1, when there is no violation. Bistable 62 produces a "count" output which is used to pair off the 0's and then to count the parity of the number of 1's sent as violations.

"Count" indicates whether a '0' was the first or second '0' of a pair when $V_F$ is reset. When $V_F$ is set "count" indicates whether each '1' is the first or second of a pair.

On any 0 "count" will go high half way through the period if that 0 is the first of a pair or low if it is the second 0. If half way through a bit period the violation flag is set then the data, bit A, will be a 1. If that 1 is the first 1 of a pair then "count" will be clocked low and if it is the second 1 then "count" will be clocked high. When the violation flag is first switched on "count" will be high and it will be high again when the flag is switched off ready to resume counting the 0's.

"Count" is the output of bistable 62 which is clocked half way through the period if $V_F$ or $\overline{\text{bit A}}$ are high. $V_F$ and $\overline{\text{bit A}}$ are ored together by OR gate 61.

The output of bistable 73 is the modified Miller code and it will have a transition at either the end of a bit period or half way through the bit period if the output of OR gate 72 is high, that is if either of its inputs is high.

The output of AND gate 69 will cause a transition in the output code at the end of a pair of 1's in a violation or at the end of the first 0 starting a violation. The output of OR gate 71 will generate transitions when the violation flag is not set. It can be set either at the end of a 0 followed by another 0 causing a transition in the code output at the end of the first 0, this being done by AND gate 67; or AND gate 68 causes a transition in the code output in the middle of a 1, when there is no violation. Bistable 63 receives on its J input via AND gate 64 the following: $\overline{\text{bit A}}$, bit B, bit C, $C_K$ and "count". On its K input bistable 63 receives via OR gate 65 $\overline{\text{bit A}}$ and the output of AND gate 66 to which is fed bit B, $\overline{\text{bit C}}$, "count" and $C_K$.

The "count", $C_K$, $V_F$, $\overline{\text{bit A}}$, $\overline{\text{bit B}}$, bit A, $C_K$ and $V_F$ outputs are fed via the network of AND gates 67, 68, 69, 70 and OR gates 71, 72 to the coding JK bistable 73 which is clocked by $2 \times C_K$. The output of bistable 73 is the modified Miller Code for transmission.

Figure 9:
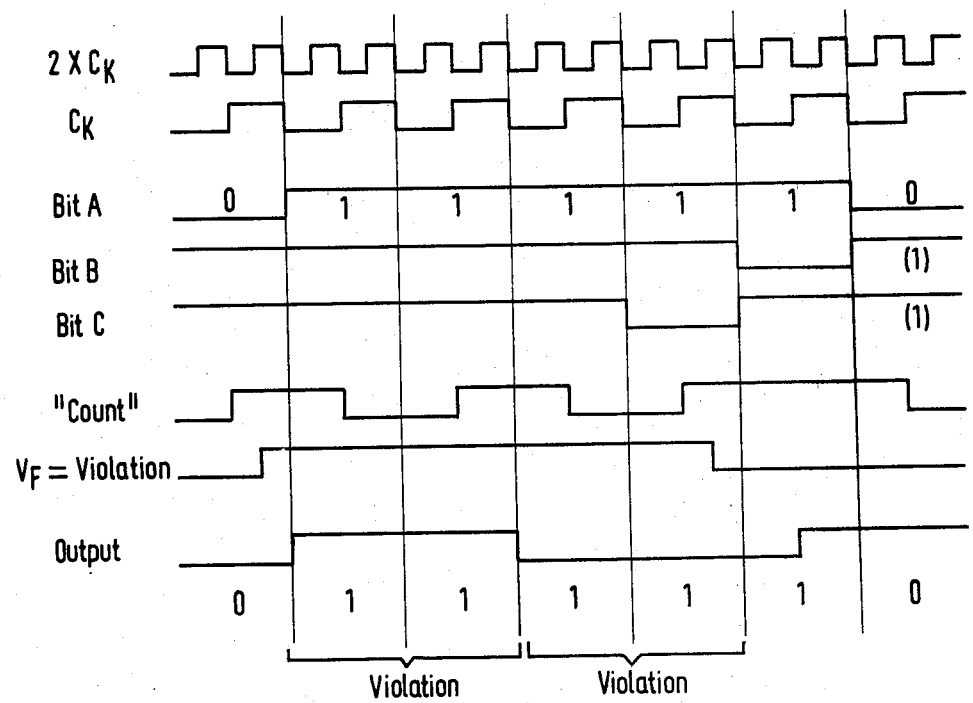

FIG. 7, 8 and 9 illustrate the operation of this circuit. FIG. 7 does not show any violations, FIG. 8 shows a violation of two 1's between a pair of 0's, and FIG. 9 shows a violation of five 1's between a pair of 0's.

Consider now the example shown in FIG. 7. Clocks, $2 \times C_K$ and $C_K$ are shown at the top. The binary data sequence to be encoded is 010111001. The timing diagram covers only the first seven digit periods of this sequence. In the first digit period the contents of bistables 60(a), 60(b) and 60(c) are 0,1 and 0 respectively. Since $\overline{\text{bit A}}$ is at a high (or 1) logic level bistable 62 counts one in the center of the digit period for the binary 0 held in 60(a). This 0 is here reckoned to be the first of a pair of 0's, the second of which is held in 60(c). At the same time $\overline{\text{bit A}}$ (logic value 1), bit B(1), bit C(0), $C_K$ and "count" are applied to AND gate 64. Since bit C is at a logic 0 the J input to bistable 63 is not set to a 1 condition. Meanwhile bit B, $\overline{\text{bit C}}$, "count" and $C_K$ are applied to AND gate 66. Since $\overline{\text{bit C}}$ is effectively a 1 and bit B is a 1 gate 66 will provide an output to OR gate 65. Gate 65 also receives $\overline{\text{bit A}}$, also effectively a 1, and so sets the K input of bistable 63 to a 1 condition. The output $V_F$ is therefore a logic 0 indicating no violation. This is to be expected since the first data 0 of the pair (held in 60(a)) is followed by only a single data 1 (held in 60(b)). Bistable 73 has both inputs set to the 0 condition by virtue of a 0 logic level appearing at one input to each of the AND gates 67, 68 and 69, hence also to one of the inputs to AND gate 70. Therefore bistable 73 will not toggle to a 1 output when clocked (it being assumed that it is already in a 0 condition).

During the next digit period the contents of the shift register are respectively 1, 0 and 1. The output of bistable 62 remains at 1 because $\overline{\text{bit A}}$ is now effectively 0 and there is still no violation output $V_F$. The "count" of 1 now represents the first data 1 following the first 0 of the pair of 0's. Similarly the $\overline{\text{bit A}}$ and bit B inputs to gate 64 are 0 while the bit C input is now 1, which together with $C_K$ and the "count" of 1 from bistable 62 maintain the J input of bistable 63 at 0. $V_F$ therefore remains at 0. The bit A input to gate 68 is now 1 up to the positive going edge of $C_K$ in the middle of the digit period and will set both inputs of bistable 73 to a 1 condition. Bistable 73 being clocked by $2 \times C_K$ will therefore toggle in the middle of the digit period.

In the next digit period the contents of bistables 60(a) etc are 011. The input $\overline{\text{bit A}}$ to gate 61 is now 1 while the $V_F$ input remains 0. Since both the J and K inputs to bistable 62 are now enabled it will toggle and the "count" output becomes 0, indicating that this is the second 0 of the pair. $V_F$ therefore remains 0. The $\overline{\text{bit A}}$ and $\overline{\text{bit B}}$ inputs to gate 67 are 1 and 0 respectively, and the bit A input to gate 68 is 0. Since neither of the other AND gates 69 and 70 is enabled the JK inputs of bistable 73 are set to 0 and it will not toggle.

In the next digit period the "count" remains at 0 since the data 0 held in 60(a) in the preceding period was in fact the second 0 of a pair, hence bistable 62 will not start counting again until the next data 0 appears in 60(a) as the first 0 of the next pair of 0's. $V_F$ remains at 0. The bit A input to gate 68 is 1, hence gate 70 is enabled since it receives the 1 output of gate 68 via OR gate 71 and also the $V_F$ input which is 1. The JK inputs to bistable 73 are enabled for the first half of the period and so it toggles in the center of the period. The operation of the logic can be similarly deduced for succeeding digit periods.

The data sequence of 1011011(10) shown in FIG. 8 contains a sequence of two 1's between two 0's which are deemed, for the purpose of this explanation, to be a pair of 0's as previously defined. Thus $V_F$ is already 0 since it only determines violations occurring within a pair—not between pairs. The "count" output of bistable 62 is 0 during the first digit period. Gate 64 is not enabled and so $V_F$ remains at 0. The bit A input to gate 68 and the $\overline{V_F}$ input to gate 70 both being 1 bistable 73 will toggle in the middle of the digit period. In the second digit period the "count" will become 1 as the content of 60(a) is now the first 0 of a pair. Due to the look ahead capability of bistable 63, which is responsive not only to the content of 60(a) but also 60(b) and 60(c), $V_F$ now becomes 1. However, because of the use of the $2 \times C_K$ clock for bistable 63 $V_F$ becomes 1 not at the end of the digit period but $\frac{3}{4}$ of the way through the second period. Thus at the end of that period the logic is set for bistable 73 to toggle, which it does because $V_F$ is now 1 and the "count" is also 1. The JK inputs to bistable 73 are enabled via gate 69. During the third digit period bistable 62 counts a violation and so its "count" output goes to 0 in the middle of the period, while $V_F$ remains at 1 because bistable 63 is still looking ahead and registering the fact that there are two 1's following the first 0 of the pair. Bistable 73 has its JK inputs set to 0 and so it does not toggle at the end of the digit period. In the fourth digit period the "count" indicates the second data 1 following the first 0 of the pair and $V_F$ indicates that the violation is still in force. Bistable 73 has both its JK inputs set to 1 and it toggles at the end of the digit period. In the fifth digit period $V_F$ ceases to indicate a violation, the "count" reverts to 0 because the second data 0 of the pair is now in 60(a) and bistable 73 does not toggle at the end of the period. In the sixth digit period the data 1 in 60(a) is coded normally since it is not between the 0's of a pair but between pairs of 0's.

FIG. 9 illustrates the case where there are five 1's, which include two consecutive violation occurrences, between the 0's of a pair of 0's. Analysis of the operation of the logic of FIG. 6 will show how the first two 1's are coded with a transition interval of two digit periods while the remaining three 1's are coded with a transition interval of $2\frac{1}{2}$ digit periods.

Decoding of the modified Miller Code is straight-forward, the significant feature being that each digit is sampled twice, once at a quarter of the way through the digit period and once $\frac{3}{4}$ of the way through the period. Comparison of these two samplings will indicate whether there was a transition in the middle of the period. If there was such a transition the digit is decoded as a 1. It is also necessary to store the result of the two samplings for comparison with the result of the samplings of the next digit period. If there was no transition for two complete periods then the two periods will each be decoded as a 1. (A distinction must be drawn between the absence of a transition in the middle of a 101 sequence, where the time interval although equal to two periods starts in the middle of a period and the 011 sequence where the 0 is the first of a pair and the transition interval of two periods duration commences at the beginning of a digit period.)

Figure 10:
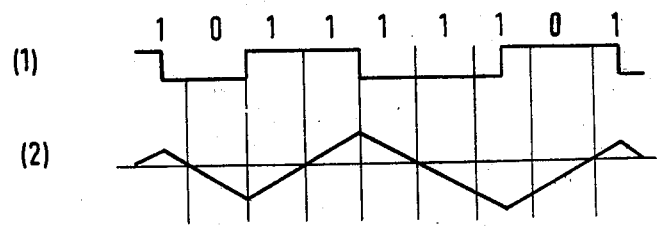
FIG. 10 illustrates the balancing effect of the modified Miller Code on a typical sequence.

If there is a sequence of 1's between pairs of 0's, then these can be coded normally as indicated at the first two 1's in FIG. 4. Alternatively if the number of 1's in such a sequence exceeds 3, then quads of adjacent 1's can be coded by the modified code, any residual 1's being coded normally. The latter case is illustrated in FIG. 10. The normal coding for 1's means a one bit interval between instances when the waveform is balanced. The corresponding imbalance at any time is that equivalent to a transition interval of $1\frac{1}{2}$ bit periods. However, if the alternative method is used, the balance interval is 4 bit periods and the maximum imbalance is that corresponding to a transition interval of 2 digit periods. These effects are also illustrated in FIG. 10.

The result of the basic modifications is to increase the rate of occurrence of 2 bit transition intervals and also to introduce $2\frac{1}{2}$ bit transition intervals. The overall result is to eliminate the DC component and to reduce the energy at the lower end of the random data frequency spectrum while introducing a shift in energy in the low frequency direction of the higher frequency components.

If the additional modification is not used for encoding of quads of 1's between pairs of 0's, then it is only necessary to look ahead one bit in order to implement the encoding. The increased complication over the normal Miller Code is thus very small.

The same rules for encoding can be applied in the case of a time separation burst mode, assuming that a balanced condition exists at the beginning of each burst. A difficulty arises however since the completion of a balanced sequence requires a second 0 or a 1 0. The required conditions may not occur before the end of the burst, where effectively a transmission discontinuity occurs.

A solution to this problem is to add an extra bit for the purpose of completing the balanced sequence. The extra bit carries no information but it does assist in increasing the noise margin of the last bit of information in the burst.

Since the burst normally contains only a relatively small number of bits, and if these are all available in a shift register before transmission, then it is practical to look ahead for the duration of the burst and to count the number of 1's between a pair of 0's. In this way these 1's can be encoded with transitions at 2 bit intervals only if there is an even number of them. This has the advantage of maintaining the maximum transition separation interval at 2 bits instead of the 2½ bits when using the modified encoding method for continuous transmission. However, the normal encoding for an odd number of 1's gives rise to an imbalance which lasts until the second 0 of a pair occurs, (which may be included as the extra bit).

We claim:

1. Apparatus for encoding a binary data stream into a modified Miller Code data stream comprising:

first means responsive to said binary stream and a control signal indicating whether the bits of said binary stream are to be coded according to a conventional Miller Code or a modified version thereof to detect successive pairs of successive binary "0" bits in said binary stream and to detect the number of binary "1" bits in said binary stream disposed between each bit of each of said pairs of "0" bits;

second means coupled to said first means responsive to said binary stream and the output signal of said first means to produce said control signal; and third means coupled to said first and second means responsive to said binary stream, the output signal of said first means and said control signal to produce said modified Miller Code data stream including a transition period of two bit periods for every pair of binary "1" bits disposed between each bit of each of said pairs of "0" bits, said transition period extending from the transition at the end of the first bit of an associated one of said pairs of "0" bits.

2. Apparatus according to claim 1, wherein said first means includes storage means to store therein three adjacent bits of said binary streams, said three bits at any one time including the current bit to be encoded, the next bit to be encoded and the following bit to be encoded, a first bistable circuit to provide the output signal for said first means, and first logic circuitry coupled to an output of said storage means, an output of said second means and at least one input of said first bistable circuit to control said first bistable circuit.

3. Apparatus according to claim 2, wherein said second means includes a second bistable circuit to produce said control signal, and second logic circuitry coupled to certain outputs of said storage means, an output of said first bistable circuit and at least one input of said second bistable circuit to control said second binary circuit.

4. Apparatus according to claim 3, wherein said third means includes a third bistable circuit to produce said modified Miller Code data stream, and third logic circuitry coupled to certain outputs of said storage means, the output of said first bistable circuit, the output of said second bistable circuit and the input of said third bistable circuit to control said third bistable circuit.

5. Apparatus according to claim 1, wherein said first means detects an odd number of binary "1" bits greater than one disposed between each bit of at least one of said pairs of "0" bits, and said third means produces said transition period for each pair of said odd number of binary "1" bits and a conventional Miller Code encoding for the remaining binary "1" bit of said odd number of binary "1" bits.

* * * * *